US012740591B2

(12) United States Patent
Lin et al.

(10) Patent No.: US 12,740,591 B2
(45) Date of Patent: Sep. 22, 2026

(54) VAPORIZER HAVING VAPORIZATION CAVITY AT INNER BOTTOM OF VAPORIZATION CORE

(71) Applicant: HUIZHOU HAPPY VAPING TECHNOLOGY LIMITED, Huizhou (CN)

(72) Inventors: Guangrong Lin, Huizhou (CN); Xianbin Zheng, Huizhou (CN)

(73) Assignee: HUIZHOU HAPPY VAPING TECHNOLOGY LIMITED, Huizhou (CN)

( * ) Notice: Subject to any disclaimer, the term of this patent is extended or adjusted under 35 U.S.C. 154(b) by 484 days.

(21) Appl. No.: 18/275,036

(22) PCT Filed: Dec. 21, 2021

(86) PCT No.: PCT/CN2021/140049
§ 371 (c)(1),
(2) Date: Jul. 31, 2023

(87) PCT Pub. No.: WO2022/161031
PCT Pub. Date: Aug. 4, 2022

(65) Prior Publication Data

US 2024/0122245 A1 Apr. 18, 2024

(30) Foreign Application Priority Data

Jan. 29, 2021 (CN) ........................ 202120266928.X

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/44* (2020.01); *A24F 40/485* (2020.01); *H05B 3/22* (2013.01)

(58) Field of Classification Search
CPC ........ A24F 40/44; A24F 40/10; A24F 40/485; A24F 40/46
See application file for complete search history.

(56) References Cited

U.S. PATENT DOCUMENTS

2022/0354164 A1* 11/2022 Lin ......................... A24F 40/42

FOREIGN PATENT DOCUMENTS

CN 106235419 A 12/2016
CN 206043434 U 3/2017
(Continued)

OTHER PUBLICATIONS

International Search Report of PCT Patent Application No. PCT/CN2021/140049 issued on Mar. 22, 2022.

*Primary Examiner* — Cedrick S Williams

(57) ABSTRACT

A vaporizer having a vaporization cavity at an inner bottom of a vaporization core comprises a housing (1), which includes a mouthpiece end (11) provided with a mouthpiece tube (111), and a connecting end (12) closed by a bottom cap (3). A vaporizing assembly (2) is provided between the mouthpiece tube (111) and the bottom cap (3) inside the housing (1). The vaporizing assembly (2) comprises a vaporization core (21), and a vaporizing base (23). The lower portion of the vaporization core (21) is inserted in a central accommodation cavity (232) of the vaporizing base (23), and the upper end of the vaporization core (21) is sleeved on the lower end of the mouthpiece tube (111). The vaporization cavity is provided at the inner bottom of the vaporization core (21), and the vaporization core (21) is provided with a central through-hole extending vertically.

8 Claims, 9 Drawing Sheets

(51) Int. Cl.

| | |
|---|---|
| ***A24F 40/44*** | (2020.01) |
| ***A24F 40/485*** | (2020.01) |
| ***H05B 3/22*** | (2006.01) |

(56) References Cited

FOREIGN PATENT DOCUMENTS

| | | | | | |
|---|---|---|---|---|---|
| CN | 110403253 | A | * | 11/2019 | ............. A24F 40/46 |
| CN | 211746948 | U | | 10/2020 | |
| CN | 112931972 | A | | 6/2021 | |
| WO | 2017206480 | A1 | | 12/2017 | |

* cited by examiner

VAPORIZER HAVING VAPORIZATION CAVITY AT INNER BOTTOM OF VAPORIZATION CORE

TECHNICAL FIELD

The disclosure relates to the technical field of electronic vaporizing device, and more particularly, to a vaporizer having a vaporization cavity at an inner bottom of a vaporization core.

BACKGROUND

Usually an electronic vaporizing device includes a battery part and a vaporizer part. A battery cell inside the battery part is to supply power to the vaporizer part. The vaporizer part includes a vaporization core, which is arranged on the vaporizing base, for heating and atomizing the to-be-vaporized solution (i.e., vaporizing liquid) into vapor fog or aerosol when powered on. In particular, for electronic vaporizing devices, such as the ones which are used as healthy electronic cigarettes and medicine vaporizing devices, the basic task is to provide a heating process for converting the solutions such as e-liquid or medicine liquid stored in the electronic vaporizing device into vapor fog, aerosol, steam, etc.

Existing vaporizers of the electronic vaporizing device usually include a lot of parts, such as the vaporization core. The vaporization core uses a liquid guiding member which is usually formed of an elongated glass fiber rope or cotton rope. Another type of vaporization core formed of ceramic may include a lot of parts as well. In order to facilitate assembly during the manufacture process, it needs to mount the glass fiber rope or cotton rope or ceramic with heating coils on the vaporizing base, and then dispose the vaporizing base and other components into the vaporizer housing in turn. Hence, it has complicated structure, inconvenient assembly, low production efficiency, and low degree of automatic production.

Existing vaporization cores usually use heating coils. However, as the contact area between the heating coils and the liquid guiding member is small, they have small heating area and thus low vaporization volume, and produce aerosol particles which are uneven in size due to unequal heating. In addition, existing vaporization cores are usually arranged on the vaporizing base, in the vaporization cavity defined by the vaporizing base. The vaporization core itself is not provided with the vaporization cavity, and the vaporization cavity is disposed in such a manner that the vaporizing surface faces upward. Usually, the vaporization cavity is directly in communication with the vapor passage located above. Thus, during heating and vaporizing of the to-be-vaporized liquid, the vapor fog or aerosol produced in the vaporization cavity can flow upward together with air flow. In such a case, unvaporized or uncondensed droplets contained therein may also flow upward and flow out easily together with air flow. It cannot effectively avoid fog mist.

SUMMARY

Technical Problem

An object of the disclosure is to overcome the above shortcomings and provide a vaporizer having a vaporization cavity at an inner bottom of a vaporization core.

Solutions for the Problem

Technical Solutions

The disclosure provides a technical solution as follow. A vaporizer having a vaporization cavity at an inner bottom of a vaporization core comprises a housing including a mouthpiece end and a connecting end, wherein the mouthpiece end is provided with a mouthpiece which extends downwards and is integrally formed with a mouthpiece tube, the connecting end is provided with an opening, and a bottom cap for closing the opening is provided. The connecting end is capable of being connected with a battery part to form an electronic vaporizing device. A vaporizing assembly is provided inside the housing and is connected between the mouthpiece tube and the bottom cap. A liquid storage chamber is defined between the vaporizing assembly and an inner wall of the housing. The vaporizing assembly comprises a vaporization core and a vaporizing base. The bottom portion of the vaporizing base is disposed on the bottom cap. The lower portion of the vaporization core is inserted in a central accommodation cavity of the vaporizing base, and the upper end of the vaporization core is sleeved on the lower end of the mouthpiece tube. The vaporization cavity is provided at the inner bottom of the vaporization core. The vaporization core is provided with a central through-hole extending vertically, the bottom cap is centrally provided with a bottom cap air inlet, the vaporizing base is centrally provided with a vaporizing base inlet hole, the vaporizing base inlet hole is in communication with the vaporization cavity, and the vaporization cavity is in communication with, in an upward direction, the central through-hole, the mouthpiece tube, and the mouthpiece.

Preferably, the vaporizing assembly may further comprise an isolation plate placed on an upper surface of the vaporizing base, the isolation plate may be provided with an isolation plate central hole, a wall of the lower portion of the vaporization core may be integrally engaged into the isolation plate central hole, and the isolation plate may be provided with isolation plate filling through-holes on its two sides.

Preferably, the vaporizing base may be provided with vaporizing base filling through-holes on its two sides, and the bottom cap may be provided with plugs for respectively plugging the vaporizing base filling through-holes at positions corresponding to respective vaporizing base filling through-holes.

Preferably, a cover plate may be arranged above the bottom cap air inlet, and an outlet opening for the bottom cap air inlet may be provided on a side wall of the lower portion of the cover plate, at a position above an inner bottom plate of the bottom cap.

Preferably, the vaporization core may comprise a sleeve, a liquid guiding member, a heating sheet, and electrode leads, wherein the liquid guiding member may be disposed inside the sleeve, the sleeve may be provided with side wall through-holes formed at positions above the vaporizing base, the side wall through-holes may be covered by the outer wall of the liquid guiding member, the liquid guiding member may be provided with the central through-hole, the heating sheet may be disposed at the bottom of the liquid guiding member and arranged with electrode leads on its two sides, a portion of the sleeve below the heating sheet may be provided with a bottom empty cavity which defines the vaporization cavity, and a portion of the sleeve above the liquid guiding member may be provided with an empty chamber which defines the vapor chamber.

Preferably, the liquid guiding member may be provided with liquid-absorbing protrusions for plugging up the side wall through-holes, at positions corresponding to the side wall through-holes.

Preferably, the sleeve may be made of heat-resistant metal material, the liquid guiding member may be made of porous ceramics material, and the vaporization core may be formed by integrally sintering materials of the sleeve, the liquid guiding member, the heating sheet, and the electrode leads molded in the mould.

Preferably, the heating sheet may be formed from a chip resistor which is capable of heating, and the chip resistor may be etched with a uniformly distributed pattern surrounding the central through-hole of the liquid guiding member.

Preferably, a lower portion of the sleeve may have a cross section greater than that of an upper portion thereof, and a lower portion of the liquid guiding member may have a cross section greater than that of an upper portion thereof.

Preferably, the sleeve may consist of an upper cylindrical tube and a lower cylindrical tube, and the liquid guiding member may consist of an upper cylindrical portion and a lower cylindrical portion.

Preferably, the sleeve may consist of an upper cylindrical tube and a lower square tube, and the liquid guiding member may consist of an upper cylindrical portion and a lower cuboid portion.

Preferably, a wall of the lower portion of the sleeve may be provided with notches, the upper portion of the liquid guiding member may be sleeved on the inner wall of the sleeve, the lower portion of the liquid guiding member may laterally extend out through the notches provided on the wall of the lower portion of the sleeve, and the lower portion of the liquid guiding member may consist of a cuboid portion.

Advantages of the Invention

Advantages

The vaporizer of the disclosure has the vaporizing assembly with simple structure and less parts, and is easy to achieve assembly by automation equipment. Herein, the vaporization core uses the heating sheet as the heating resistance for heating. As the contact area between the heating sheet and the liquid guiding member is large, they have large heating area and achieve high vaporization volume due to equal heating. Due to the configuration of the vaporization cavity provided at the inner bottom of the vaporization core, the vapor fog or aerosol produced during heating and vaporization of the to-be-vaporized liquid can flow downward to the vaporization cavity and then flow upward and outside. In such a case, unvaporized or uncondensed droplets contained therein may fall down or condense and would not easily flow upward together with the air flow. It effectively prevents droplets and the mist from being inhaled by the users, thereby improving user experience. The vaporization core is arranged with the housing, to protect the liquid guiding member disposed inside, thereby preventing the liquid guiding member made of porous ceramics material from cracking and damage, and increasing service life of the products.

DETAILED DESCRIPTION OF ILLUSTRATED EMBODIMENTS

Preferred Embodiment of the Invention

Embodiment 1

Figure 1:
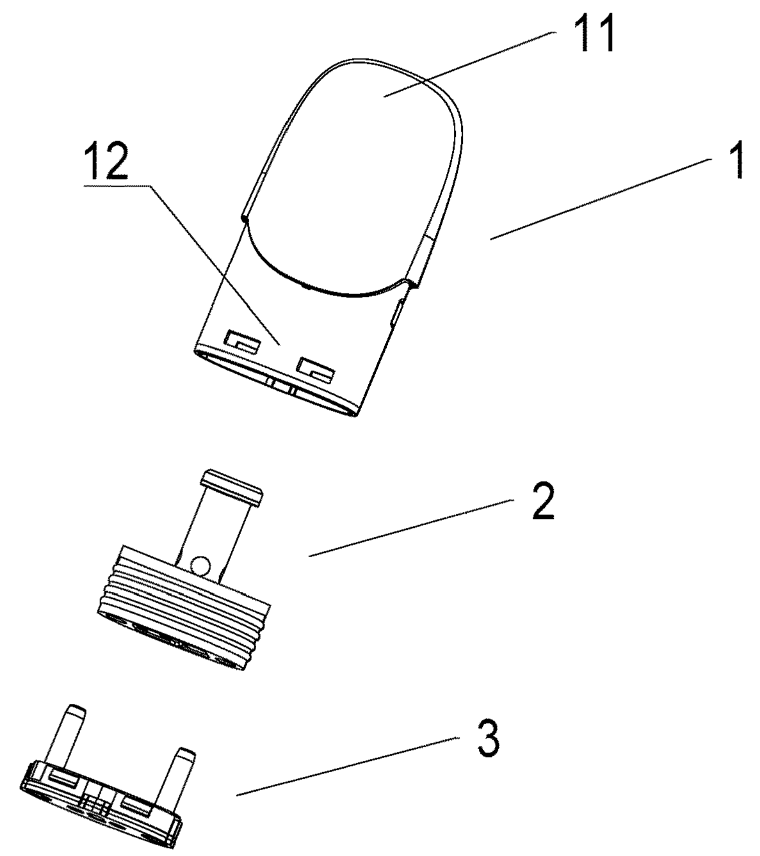
FIG. 1 is a perspective structural view illustrating a vaporizer according to Embodiment 1 of the disclosure in a disassembled state.

Referring to FIGS. 1-5, a vaporizer having a vaporization cavity at an inner bottom of a vaporization core according to the disclosure comprises a housing 1 which consists of a mouthpiece end 11 and a connecting end 12. The mouthpiece end 11 is provided with a mouthpiece 110. The mouthpiece 110 extends downwards and is integrally formed with a mouthpiece tube 111. The connecting end 12 is provided with an opening 120, and a bottom cap 3 is provided for closing the opening 120. The connecting end 12 may be connected with a battery part to form an electronic vaporizing device (not shown in the drawings).

A vaporizing assembly 2 is connected between the mouthpiece tube 111 and the bottom cap 3. A liquid storage chamber 10 for storing the to-be-vaporized liquid is defined between the outer wall of the vaporizing assembly 2 and the inner wall of the housing 1. The housing 1 in the embodiment has a cross section in an oval shape, and the mouthpiece end 11 has a decreasing size in the upward direction.

Referring to FIGS. 1-12, the vaporizing assembly 2 comprises a vaporization core 21, an isolation plate 22, and a vaporizing base 23. The bottom portion of the vaporizing base 23 is disposed on the bottom cap 3. The isolation plate 22 is placed on the upper surface of the vaporizing base 23. The lower portion of the vaporization core 21 is inserted in a central accommodation cavity 232 of the vaporizing base 23, and the upper end of the vaporization core 21 is sleeved on the lower end of the mouthpiece tube 111. The isolation plate 22 is provided with a central hole 220, through which the vaporization core 21 is tightly connected with the isolation plate 22. The isolation plate 22 facilitates fixed mounting of the vaporization core 21 on the vaporizing base 23, achieves isolation and sealing of the vaporizing base 23 and the vaporization cavity 2114, and helps to form the liquid storage chamber 10. The isolation plate 22 is provided on two sides with an isolation plate filling through-hole 221, respectively, such that the to-be-vaporized liquid can be filled into the liquid storage chamber 10 of the vaporizer through the vaporizing base filling through-holes 231 and the isolation plate filling through-holes 221 after mounting of the vaporization core 21. The lower portion of the isolation plate 22 is provided with a supporting wall 222 which is formed along the edge of the central hole 220 and perpendicular to the isolation plate 22. The supporting wall 222 tightly abuts on the surface of the lower portion of the sleeve 211 of the vaporization core and is received in the central accommodation cavity 232 of the vaporizing base 23 in such a manner that the isolation plate 22 can be securely mounted on the vaporizing base 23.

Figure 9:
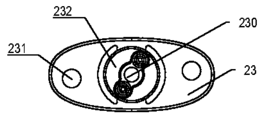
FIG. 9 is a top view of a vaporizing base according to Embodiment 1 of the disclosure.
Figure 10:
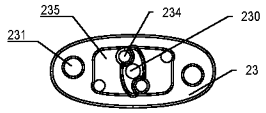
FIG. 10 is a bottom view of a vaporizing base according to Embodiment 1 of the disclosure.
Figure 11:
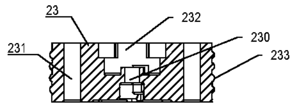
FIG. 11 is a cross-sectional view of a vaporizing base according to Embodiment 1 of the disclosure.
Figure 12:
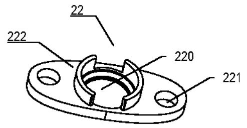
FIG. 12 is a perspective view illustrating an isolation plate according to Embodiment 1 of the disclosure.

Referring to FIGS. 9-11, the vaporizing base 23 is made of soft heat resistant silica gel material. The side wall of the vaporizing base 23 is provided with circumferential ribs 233 for sealing the gap between the vaporizing base 23 and inner wall of the housing 1, so as to avoid leakage of the to-be-vaporized liquid stored in the liquid storage chamber 10. The upper portion of the vaporizing base 23 is centrally provided with a central accommodation cavity 232 for mounting the vaporization core 21. The lower portion of the central accommodation cavity 232 is provided with a vaporizing base inlet hole 230. The vaporizing base 23 is provided on its two sides with a vaporizing base filling through-hole 231, respectively. The respective vaporizing base filling through-hole 231 is in communication with corresponding isolation plate filling through-hole 221 located above. After the vaporizing assembly 2 is mounted inside the housing 1, the to-be-vaporized liquid can be filled into the liquid storage chamber 10 through the two filling through-holes. Then, the bottom cap 3 can be mounted, with the plugs 31 of the bottom cap 3 plugging the vaporizing base filling through-holes 231 and the isolation plate filling through-holes 221, respectively. The lead holes 234, which allow electrode leads 214 to pass through, are provided beside the vaporizing base inlet hole 230. The bottom portion of the vaporizing base 23 is provided with a bottom recess 235 concaved upward, to facilitate forming of an air inlet passage between the vaporizing base 23 and the bottom cap 3.

Figure 13:
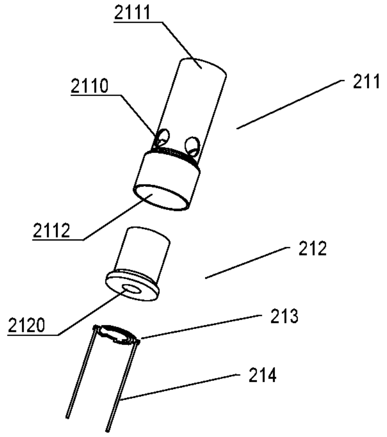
FIG. 13 is a perspective structural view illustrating a vaporization core according to Embodiment 1 of the disclosure in a disassembled state.
Figure 14:
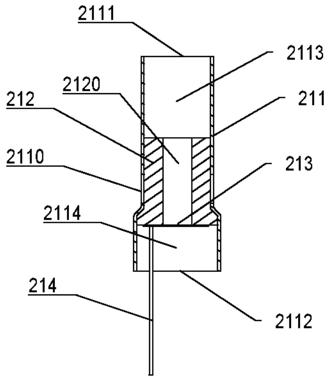
FIG. 14 is a cross-sectional view of a vaporization core according to Embodiment 1 of the disclosure.

Referring to FIGS. 13 and 14, the vaporization core 21 comprises a sleeve 211, a liquid guiding member 212, a heating sheet 213, and electrode leads 214. The sleeve 211 is provided with an upper opening 2111, a lower opening 2112, and side wall through-holes 2110 in the middle. The side wall through-holes 2110 are formed at positions above the vaporizing base 23. The liquid guiding member 212 is disposed inside the sleeve 211 at a middle or lower section. The side wall through-holes 2110 are covered by the outer wall of the liquid guiding member 212. The liquid guiding member 212 is provided with a central through-hole 2120 extending vertically in communication with the upper opening 2111 and the lower opening 2112 of the sleeve 211. The heating sheet 213 is disposed at the bottom of the liquid guiding member 212 and is arranged with electrode leads 214 on its two sides. A portion of the sleeve 211 below the heating sheet 213 is provided with a bottom cavity which defines the vaporization cavity 2114. A portion of the sleeve 211 above the liquid guiding member 212 is provided with an empty chamber which defines the vapor chamber 2113. The upper end of the sleeve 211 is sleeved on the lower end of the mouthpiece tube 111, and a sealing element 24 for sealing is disposed therebetween. The lower portion of the sleeve 211 has a cross section greater than that of the upper portion, and the lower portion of the liquid guiding member 212 has a cross section greater than that of the upper portion, such that the heating area of the lower portion of the liquid guiding member 212 can be increased. In such a case, during operation of the vaporizer, the vapor volume produced per unit time can be increased, thereby improving user experience. The sleeve 211 of the disclosure has a cylindrical structure with a small upper portion and a greater lower portion. Referring to FIGS. 13 and 14, the sleeve 211 is made of heat-resistant metal material, and the liquid guiding member 212 is made of porous ceramics material. The sleeve 211 made of metal material can well support and protect the liquid guiding member 212 made of porous ceramics material, to prevent the liquid guiding member 212 from cracking to cause liquid leakage or poor vaporization during operation.

The vaporization core is formed by integrally sintering materials of the sleeve 211, the liquid guiding member 212, the heating sheet 213, and the electrode leads 214 molded in the mould. In such a case, the vaporization core is integrally formed and is provided with own vaporization cavity. In order to facilitate assembly to the vaporizer, the vaporization core 21 and the isolation plate 22 can be mounted on the vaporizing base 23 first, to constitute the vaporizing assembly 2. Then, the vaporizing assembly can be integrally mounted inside the housing 1. Then, the bottom cap 3 can be mounted after liquid filling. In such a case, it has less parts and components and simple assembly, and is easy to achieve automatic production. Furthermore, after the vaporization core of the disclosure is mounted on the vaporizer, the housing 1 of the vaporization core is directly disposed inside the liquid storage chamber of the vaporizer and in direct contact with the to-be-vaporized liquid inside the liquid storage chamber. The sleeve 211 of the vaporization core is made of metal material. Thus, during operation, excess energy of the heating sheet 213 can be transferred to the sleeve 211 by the liquid guiding member 212, and then transferred from the sleeve 211 to the to-be-vaporized liquid. In such a case, during operation, the to-be-vaporized liquid can be quickly heated, to have increased fluidity. Hence, the vaporization core of the disclosure can use the to-be-vaporized liquid with higher viscosity.

According to the disclosure, the vaporization core 21 itself is provided with the vaporization cavity at its bottom and is externally provided with the sleeve. Consequently, the vaporizing base 23 can be prevented from being burned or damaged when the vaporization is performed inside the vaporization cavity, as the vaporization core which has high temperature inside does not directly contact the vaporizing base.

The heating sheet 213 is formed by etching the chip resistor, which is capable of heating, with a pattern surrounding the central through-hole of the liquid guiding member. The heating sheet 213 may be made of nickel-chromium, or tungsten filament, or silver alloy, or Fe—Cr—Al material.

Figure 15:
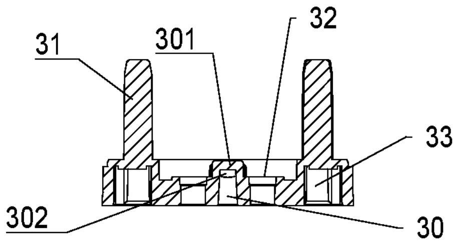
FIG. 15 is a front cross-sectional view of a bottom cap according to Embodiment 1 of the disclosure.
Figure 16:
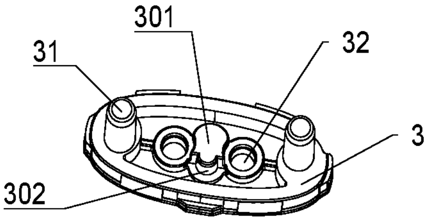
FIG. 16 is a perspective view illustrating a bottom cap according to Embodiment 1 of the disclosure.
Figure 17:
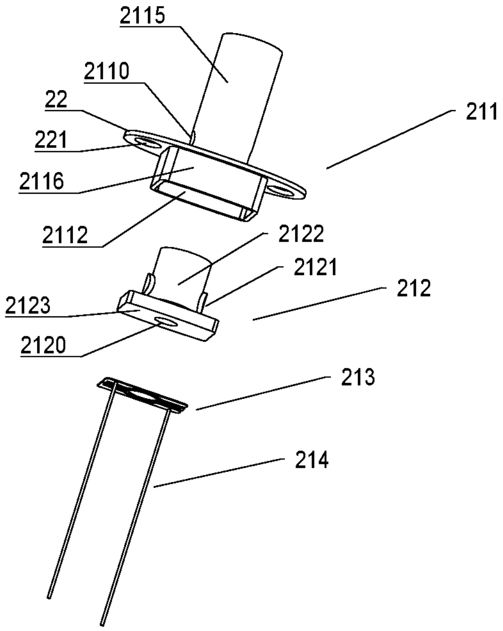
FIG. 17 is a perspective structural view illustrating a vaporization core according to Embodiment 2 of the disclosure in a disassembled state.
Figure 18:
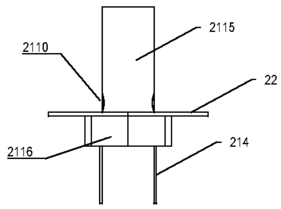
FIG. 18 is a front view of a vaporization core according to Embodiment 2 of the disclosure.
Figure 19:
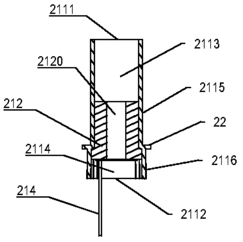
FIG. 19 is a cross-sectional view of a vaporization core according to Embodiment 2 of the disclosure.
Figure 20:
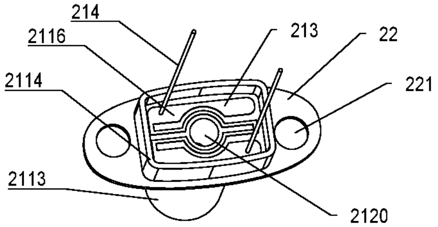
FIG. 20 is a perspective view illustrating a vaporization core according to Embodiment 2 of the disclosure.

Referring to FIGS. 15 and 16, the bottom cap 3 is centrally provided with a bottom cap air inlet 30, the vaporizing base 23 is centrally provided with a vaporizing base inlet hole 230, the vaporizing base inlet hole 230 is in communication with the central accommodation cavity 232 and the vaporization cavity 2114, and the vaporization cavity 2114 is in communication with, in an upward direction, the central through-hole 2120 of the liquid guiding member, the vapor chamber 2113, the mouthpiece tube 111, and the mouthpiece 10.

The vaporizing base 23 is provided on its two sides with vaporizing base filling through-holes 231. The bottom cap 3 is provided with the plugs 31 for respectively plugging the vaporizing base filling through-holes 231 at positions corresponding to respective vaporizing base filling through-holes 231. The bottom cap 3 is further provided with electrode through-holes 32 for mounting and connecting electrodes. The bottom cap 3 is further provided with blind holes 33 for mounting magnetic materials so as to achieve magnetic connection with the battery part (not shown in the drawings).

Referring to FIGS. 2, 3, 15, and 16, the air inlet 30 of the bottom cap does not have an upper opening which directly opens upward. Instead, a cover plate 301 is arranged above the air inlet 30, and an outlet opening 302 is provided on the side wall of the lower portion of the cover plate 301, at a position above the bottom plate of the bottom cap 3. In such a case, it avoids leakage of unvaporized or uncondensed droplets through the bottom cap air inlet 30 to the outside.

The working principle of the embodiment of the disclosure is as follows.

Figure 2:
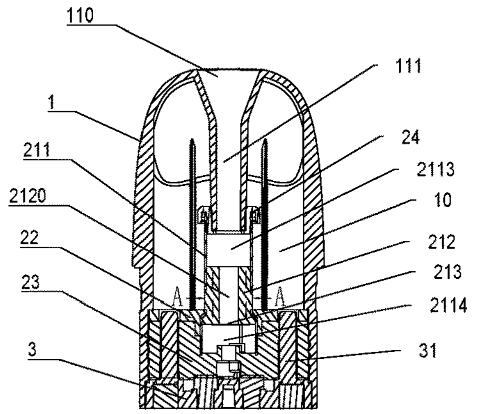
FIG. 2 is a front cross-sectional view of a vaporizer according to Embodiment 1 of the disclosure.

Referring to FIG. 2, as indicated by the arrow A, the to-be-vaporized liquid stored in the liquid storage chamber 10 may flow through the side wall through-holes 2110, then may be absorbed by the liquid guiding member 212, and then may be transferred inward to the bottom of the liquid guiding member 212, above the heating sheet 213.

Figure 3:
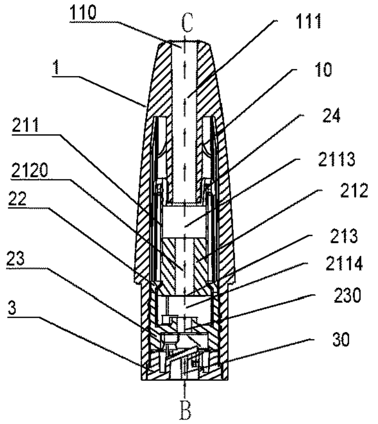
FIG. 3 is a side cross-sectional view of a vaporizer according to Embodiment 1 of the disclosure.
Figure 4:
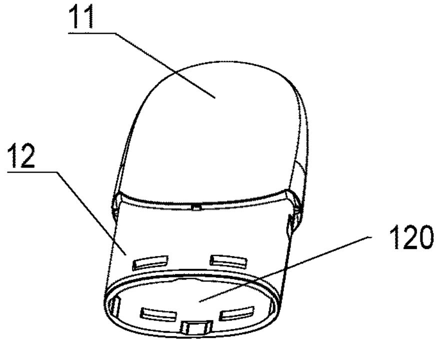
FIG. 4 is a schematic perspective view of a housing of a vaporizer according to Embodiment 1 of the disclosure.
Figure 5:
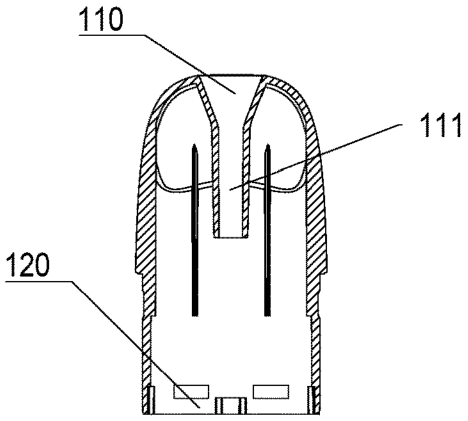
FIG. 5 is a front cross-sectional view of a housing of a vaporizer according to Embodiment 1 of the disclosure.
Figure 6:
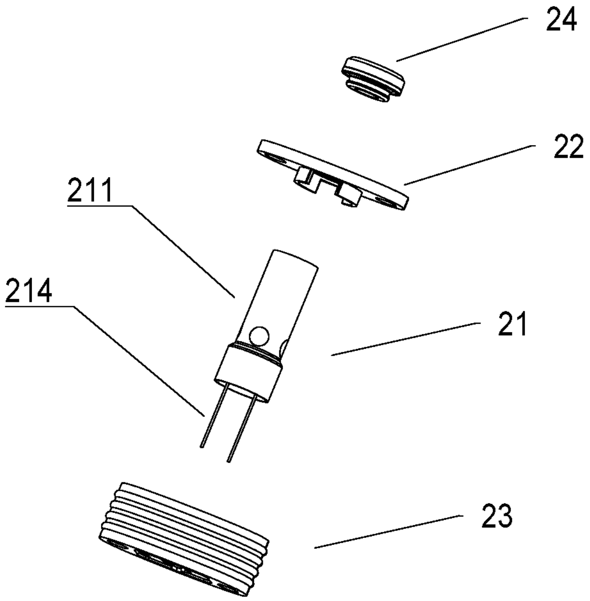
FIG. 6 is a perspective structural view illustrating a vaporizing assembly according to Embodiment 1 of the disclosure in a disassembled state.
Figure 7:
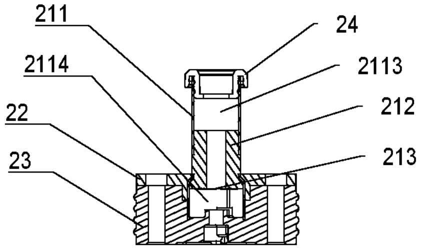
FIG. 7 is a front cross-sectional view of a vaporizing assembly according to Embodiment 1 of the disclosure.
Figure 8:
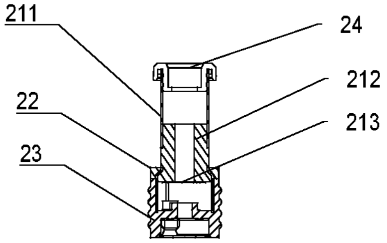
FIG. 8 is a side cross-sectional view of a vaporizing assembly according to Embodiment 1 of the disclosure.

As indicated by the arrows B and C shown in FIG. 3, outside air may enter through the bottom of the vaporizer, and then flow to the vaporization cavity 2114 through the bottom cap air inlet 30 and the vaporizing base inlet hole 230. The heating sheet 213 heat and vaporize the to-be-vaporized liquid at the bottom of the liquid guiding member 212 when powered on. Then, the produced vapor fog may flow toward the vaporization cavity 2114, and then may flow upward together with the air entered from outside. They may flow out through the central through-hole 2120 of the liquid guiding member, the vapor chamber 2113, the mouthpiece tube 111, the mouthpiece 110, and the mouthpiece 110, and then may be inhaled by the user.

Embodiments of the Disclosure

Examples of the Disclosure

The disclosure will be explained in detail below in conjunction with other particular embodiments.

Embodiment 2

The structures of the vaporization core and the vaporizing base in the embodiment are slightly different from those in Embodiment 1 as mentioned above.

Referring to FIGS. 17-20, the vaporization core 21 comprises a sleeve 211, a liquid guiding member 212, a heating sheet 213, and electrode leads 214. The sleeve 211 is provided with an upper opening 2111, a lower opening 2112, and side wall through-holes 2110 in the middle. The liquid guiding member 212 is disposed inside the sleeve 211 at a middle or lower section. The liquid guiding member 212 is provided with liquid-absorbing protrusions 2121 for plugging up the side wall through-holes 2110, at positions corresponding to the side wall through-holes 2110. The liquid guiding member 212 is provided with a central through-hole 2120 extending vertically in communication with the upper opening 2111 and the lower opening 2112 of the sleeve 211. The heating sheet 213 is disposed at the bottom of the liquid guiding member 212 and is arranged with electrode leads 214 on its two sides. A portion of the sleeve 211 below the heating sheet 213 is provided with a bottom empty cavity which defines the vaporization cavity 2114. A portion of the sleeve 211 above the liquid guiding member 212 is provided with an empty chamber which defines the vapor chamber 2113. The upper end of the sleeve 211 is sleeved on the lower end of the mouthpiece tube 111, and a sealing element 24 for sealing is disposed therebetween. The lower portion of the sleeve 211 has a cross section greater than that of the upper portion, and the lower portion of the liquid guiding member 212 has a cross section greater than that of the upper portion, such that the heating area of the lower portion of the liquid guiding member 212 can be increased. In such a case, during operation of the vaporizer, the vapor volume produced per unit time can be increased, thereby improving user experience. The sleeve 211 of the disclosure includes an upper cylindrical tube 2115 and a lower square tube 2116. That is, the sleeve 211 consists of the upper cylindrical tube and the lower square tube. Accordingly, the upper portion 2122 of the liquid guiding member 212 is in cylindrical shape and the lower portion 2123 is in cuboid shape. As the lower portion of the liquid guiding member 212 is designed to have a square cross section, the heating and vaporizing area can be increased.

In the embodiment, the isolation plate 22 is disposed on the outer wall of the sleeve 211, at the joint between the upper cylindrical tube 2115 and the lower square tube 2116. The isolation plate 22 and the sleeve 211 are integrally formed. The isolation plate 22 is provided on its two sides with isolation plate filling through-holes 221. The isolation plate 22 facilitates fixed mounting of the vaporization core 21 on the vaporizing base 23 of the vaporizer, and achieves isolation of the vaporizing base 23 and the liquid storage chamber 10. The isolation plate 22 is provided on two sides with an isolation plate filling through-hole 221, respectively, such that the to-be-vaporized liquid can be filled into the liquid storage chamber 10 of the vaporizer through the isolation plate filling through-holes 221 after mounting of the vaporization core.

Figure 21:
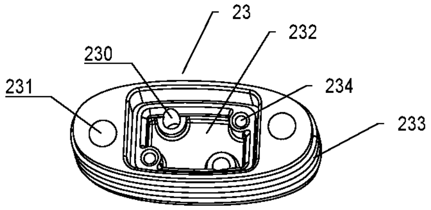
FIG. 21 is a perspective view illustrating a vaporizing base according to Embodiment 2 of the disclosure.
Figure 22:
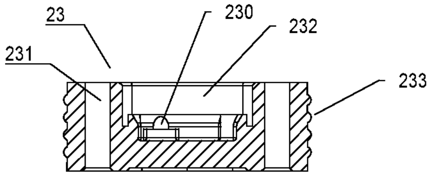
FIG. 22 is a cross-sectional view of a vaporizing base according to Embodiment 2 of the disclosure.

Referring to FIGS. 21 and 22, the vaporizing base 23 is made of soft heat resistant silica gel material. The side wall of the vaporizing base 23 is provided with circumferential ribs 233 for sealing the gap between the vaporizing base 23 and inner wall of the housing 1, so as to avoid leakage of the to-be-vaporized liquid stored in the liquid storage chamber 10. The upper portion of the vaporizing base 23 is centrally provided with a central accommodation cavity 232 for mounting the vaporization core 21. The central accommodation cavity 232 has a cross section in a square shape, to allow mounting of the lower square tube 2116 of the sleeve 211. The lower portion of the central accommodation cavity 232 is provided with a vaporizing base inlet hole 230. The vaporizing base 23 is provided on its two sides with a vaporizing base filling through-hole 231, respectively. The respective vaporizing base filling through-hole 231 is in communication with corresponding isolation plate filling through-hole 221 located above. Beside the vaporizing base inlet hole 230, lead holes 234 which allow electrode leads 214 to pass through are provided.

Other features of the embodiment that are not mentioned here are the same as in Embodiment 1.

Embodiment 3

The structures of the vaporization core and the vaporizing base in the embodiment are slightly different from those in Embodiment 1 as mentioned above.

Figure 23:
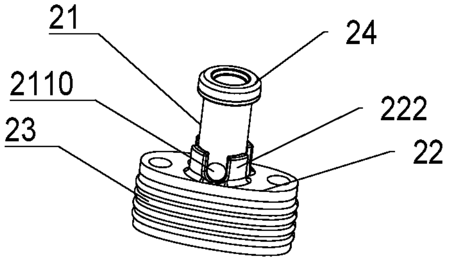
FIG. 23 is a perspective view illustrating a vaporizing assembly according to Embodiment 3 of the disclosure.

Referring to FIG. 23, the vaporizing assembly 2 comprises a vaporization core 21, an isolation plate 22, and a vaporizing base 23.

Figure 24:
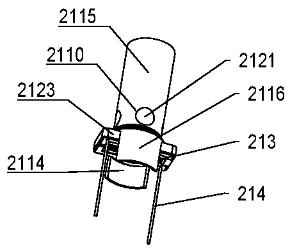
FIG. 24 is a perspective view illustrating a vaporization core according to Embodiment 3 of the disclosure.
Figure 25:
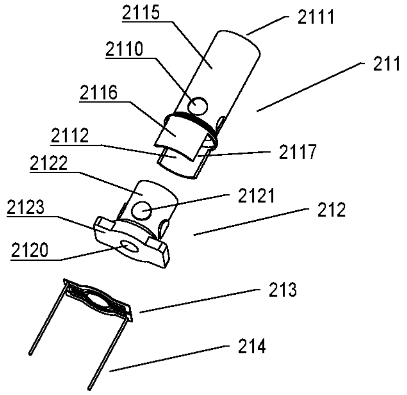
FIG. 25 is a perspective structural view illustrating a vaporization core according to Embodiment 3 of the disclosure in a disassembled state.
Figure 26:
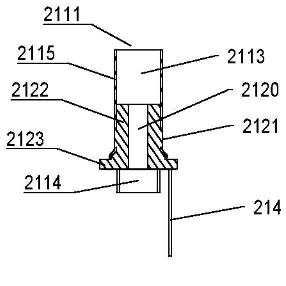
FIG. 26 is a cross-sectional view of a vaporization core according to Embodiment 3 of the disclosure.

Referring to FIGS. 24-26, the vaporization core 21 comprises a sleeve 211, a liquid guiding member 212, a heating sheet 213, and electrode leads 214. The sleeve 211 is provided with an upper opening 2111, a lower opening 2112, and side wall through-holes 2110. The side wall through-holes 2110 are provided at positions above the vaporizing base 23. The wall of the lower portion of the sleeve 211 is provided with notches 2117, the upper portion 2122 of the liquid guiding member 212 is sleeved on the inner wall of the sleeve 211, and the lower portion 2123 of the liquid guiding member 212 laterally extends out through the notches 2117 provided on the wall of the lower portion of the sleeve. The liquid guiding member 212 is provided with liquid-absorbing protrusions 2121 for plugging up the side wall through-holes 2110, at positions corresponding to the side wall through-holes 2110. The liquid guiding member 212 is provided with a central through-hole 2120 extending vertically in communication with the upper opening 2111 and the lower opening 2112 of the sleeve. The heating sheet 213 is disposed at the bottom of the liquid guiding member 212 and is arranged with electrode leads 214 on its two sides. An open vaporization cavity 2114 is defined below the heating sheet 213. A portion of the sleeve 211 above the liquid guiding member is provided with an empty chamber which defines the vapor chamber 2113. In the embodiment, the sleeve 211 includes an upper cylindrical tube 2115 and a lower cylindrical tube 2116 which is symmetrically provided with notches 2117 on two sides. Herein, the lower cylindrical tube 2116 has a cross section greater than that of the upper cylindrical tube 2115. The liquid guiding member 212 includes the upper portion 2122 in a cylindrical shape and a lower portion 2123 in a cuboid shape, and the cuboid portion 2123 laterally extends out through the notches 2117.

An open vaporization cavity 2114 is defined below the heating sheet 213. An empty chamber, which defines the vapor chamber 2113, is provided in the sleeve 211 above the liquid guiding member 212. Consequently, the vapor fog or aerosol produced during heating of the to-be-vaporized liquid can flow downward to the open vaporization cavity 2114 through the heating sheet 213, and then can flow upward through the central through-hole 2120 of the liquid guiding member 212. In such a case, unvaporized or uncondensed droplets may fall down or condense and would not easily flow upward together with the air flow. Thus, it effectively prevents droplets and the mist from flowing out and being inhaled by the users, thereby improving user experience.

Figure 27:
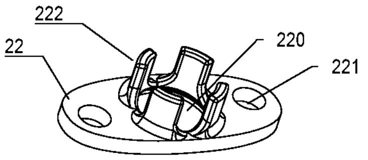
FIG. 27 is a perspective view illustrating an isolation plate according to Embodiment 3 of the disclosure.

Referring to FIGS. 23 and 27, the isolation plate 22 is provided with a central hole 220, through which the vaporization core 21 is tightly connected with the isolation plate 22. The isolation plate 22 facilitates fixed mounting of the vaporization core 21 on the vaporizing base 23, achieves isolation and sealing of the vaporizing base 23 and the vaporization cavity 2114, and helps to form the liquid storage chamber 10. The isolation plate 22 is provided on two sides with an isolation plate filling through-hole 221, respectively, such that the to-be-vaporized liquid can be filled into the liquid storage chamber 10 of the vaporizer through the vaporizing base filling through-holes 231 and the isolation plate filling through-holes 221 after mounting of the vaporization core 21. The upper portion of the isolation plate 22 is provided with four arched supporting walls 222 which are formed along the edge of the central hole 220 and perpendicular to the isolation plate 22. The supporting wall 222 tightly abuts on the surface of the upper portion of the sleeve 211 in such a manner that the isolation plate 22 can be securely mounted on the vaporizing base 23. Herein, the side wall through-holes 2110 of the sleeve 211 are exposed between the supporting walls 222.

Figure 28:
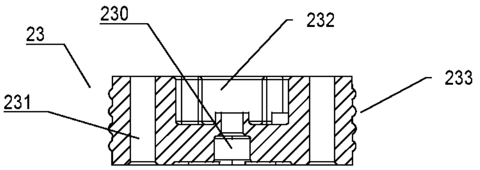
FIG. 28 is a cross-sectional view of a vaporizing base according to Embodiment 3 of the disclosure.
Figure 29:
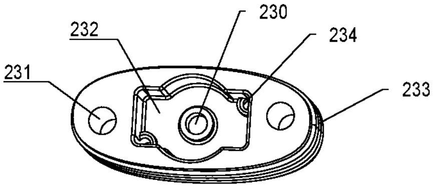
FIG. 29 is a first perspective view illustrating a vaporizing base according to Embodiment 3 of the disclosure.
Figure 30:
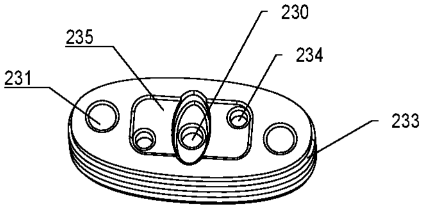
FIG. 30 is a second perspective view illustrating a vaporizing base according to Embodiment 3 of the disclosure.

Referring to FIGS. 28-30, the vaporizing base 23 is made of soft heat resistant silica gel material. The side wall of the vaporizing base 23 is provided with circumferential ribs 233 for sealing the gap between the vaporizing base 23 and inner wall of the housing 1, so as to avoid leakage of the to-be-vaporized liquid stored in the liquid storage chamber 10. The upper portion of the vaporizing base 23 is centrally provided with a central accommodation cavity 232 for mounting the vaporization core 21. The central accommodation cavity 232 has a cross section in a rectangle shape, to allow mounting of the lower rectangle portion 2123 of the liquid guiding member 212 and the lower cylindrical tube 2116 of the sleeve. In such as case, the open vaporization cavity 2114 of the abovementioned vaporization core and the inner wall of the central accommodation cavity 232 of the vaporizing base 23 enclose the vaporization cavity. The lower portion of the central accommodation cavity 232 is provided with a vaporizing base inlet hole 230. The vaporizing base 23 is provided on its two sides with a vaporizing base filling through-hole 231, respectively. The respective vaporizing base filling through-hole 231 is in communication with corresponding isolation plate filling through-hole 221 located above. Beside the vaporizing base inlet hole 230, lead holes 234 which allow electrode leads 214 to pass through are provided. The bottom portion of the vaporizing base 23 is provided with a bottom recess 235 concaved upward, to facilitate forming of an air inlet passage between the vaporizing base 23 and the bottom cap 3.

Other features of the embodiment that are not mentioned here are the same as in Embodiment 1.

INDUSTRIAL APPLICABILITY

All the above are merely preferred embodiments of the disclosure. The present invention is intended to cover all modifications and equivalent arrangements claimed by the present invention.

The invention claimed is:

1. A vaporizer having a vaporization cavity at an inner bottom of a vaporization core, comprising a housing including a mouthpiece end and a connecting end, wherein the mouthpiece end is provided with a mouthpiece extending downwards and integrally formed with a mouthpiece tube, the connecting end is provided with an opening closed by a bottom cap, the connecting end is capable of being connected with a battery part to form an electronic vaporizing device, wherein a vaporizing assembly is provided inside the housing and is connected between the mouthpiece tube and the bottom cap, a liquid storage chamber is defined between the vaporizing assembly and an inner wall of the housing, the vaporizing assembly comprises a vaporization core and a vaporizing base, a bottom portion of the vaporizing base is disposed on the bottom cap, a lower portion of the vaporization core is inserted in a central accommodation cavity of the vaporizing base, an upper end of the vaporization core is sleeved on a lower end of the mouthpiece tube, the vaporization cavity is provided at the inner bottom of the vaporization core, the vaporization core is provided with a central through-hole extending vertically, the bottom cap is centrally provided with a bottom cap air inlet, the vaporizing base is centrally provided with a vaporizing base inlet hole, the vaporizing base inlet hole is in communication with the vaporization cavity, and the vaporization cavity is in communication with the central through-hole, the mouthpiece tube, and the mouthpiece in an upward direction;

the vaporizing assembly further comprises an isolation plate placed on an upper surface of the vaporizing base, wherein the isolation plate is provided with an isolation plate central hole, a wall of the lower portion of the vaporization core is integrally engaged into the isolation plate central hole, and the isolation plate is provided on two sides with isolation plate filling through-holes;

the vaporizing base is provided on two sides with vaporizing base filling through-holes, and the bottom cap is provided with plugs for respectively plugging the vaporizing base filling through-holes at positions corresponding to respective vaporizing base filling through-holes;

a cover plate is disposed above the bottom cap air inlet, and an outlet opening for the bottom cap air inlet is provided on a side wall of the lower portion of the cover plate, at a position above an inner bottom plate of the bottom cap;

characterized in that, the vaporization core comprises a sleeve, a liquid guiding member, a heating sheet, and electrode leads, wherein the liquid guiding member is disposed inside the sleeve, the sleeve is provided with side wall through-holes above the vaporizing base, the side wall through-holes are covered by an outer wall of the liquid guiding member, the liquid guiding member is provided with the central through-hole, the heating sheet is disposed at bottom of the liquid guiding member, the electrode leads are disposed on two sides of the heating sheet, a portion of the sleeve below the heating sheet is provided with a bottom cavity which defines the vaporization cavity, and a portion of the sleeve above the liquid guiding member is provided with an empty chamber which defines the vapor chamber.

2. The vaporizer having a vaporization cavity at an inner bottom of a vaporization core according to claim 1, characterized in that, the liquid guiding member is provided with liquid-absorbing protrusions for plugging up the side wall through-holes at positions corresponding to the side wall through-holes.

3. The vaporizer having a vaporization cavity at an inner bottom of a vaporization core according to claim 1, characterized in that, the sleeve is made of heat-resistant metal material, the liquid guiding member is made of porous ceramics material, and the vaporization core is formed by integrally sintering materials of the sleeve, the liquid guiding member, the heating sheet, and the electrode leads molded in the mould.

4. The vaporizer having a vaporization cavity at an inner bottom of a vaporization core according to claim 1, characterized in that, the heating sheet is formed from a chip resistor which is capable of heating, and the chip resistor is etched with a uniformly distributed pattern surrounding the central through-hole of the liquid guiding member.

5. The vaporizer having a vaporization cavity at an inner bottom of a vaporization core according to claim 1, characterized in that, a lower portion of the sleeve has a cross section greater than that of an upper portion of the sleeve, and a lower portion of the liquid guiding member has a cross section greater than that of an upper portion of the liquid guiding member.

6. The vaporizer having a vaporization cavity at an inner bottom of a vaporization core according to claim 5, characterized in that, the sleeve consists of an upper cylindrical tube and a lower cylindrical tube, and the liquid guiding member consists of an upper cylindrical portion and a lower cylindrical portion.

7. The vaporizer having a vaporization cavity at an inner bottom of a vaporization core according to claim 5, characterized in that, the sleeve consists of an upper cylindrical tube and a lower square tube, and the liquid guiding member consists of an upper cylindrical portion and a lower cuboid portion.

8. The vaporizer having a vaporization cavity at an inner bottom of a vaporization core according to claim 5, characterized in that, a wall of the lower portion of the sleeve is provided with notches, the upper portion of the liquid guiding member is sleeved on the inner wall of the sleeve, the lower portion of the liquid guiding member laterally extends out through the notches provided on the wall of the lower portion of the sleeve, and the lower portion of the liquid guiding member consists of a cuboid portion.

* * * * *